United States Patent [19]

Root et al.

[11] 4,286,297

[45] Aug. 25, 1981

[54] SUSPENSION FOR FLYING MAGNETIC HEAD

[75] Inventors: Ronald R. Root, Rochester, Minn.; Michael W. Warner; Robert B. Watrous, both of San Jose, Calif.

[73] Assignee: International Business Machines Corporation, Armonk, N.Y.

[21] Appl. No.: 73,060

[22] Filed: Sep. 6, 1979

[51] Int. Cl.³ .................. G11B 5/48; G11B 21/20
[52] U.S. Cl. .................. 360/103; 360/102; 360/104
[58] Field of Search .................. 360/104, 102–103, 360/105–106, 75

[56] References Cited

U.S. PATENT DOCUMENTS

| | | | |
|---|---|---|---|
| 3,701,610 | 10/1972 | Buslik et al. | 360/103 X |
| 4,120,010 | 10/1978 | Mitsuya et al. | 360/103 |
| 4,141,049 | 2/1979 | Watrous | 360/103 |
| 4,167,765 | 9/1979 | Watrous | 360/103 |

Primary Examiner—John H. Wolff
Attorney, Agent, or Firm—Nathan N. Kallman

[57] ABSTRACT

A flying magnetic head assembly includes a head suspension formed with spaced resilient sections for providing opposing angular motions, so that the head slider mounted to the suspension maintains a parallel relation to the surface of a magnetic medium, as the suspension and slider are moved aerodynamically into flying transducing relation with the medium.

4 Claims, 5 Drawing Figures

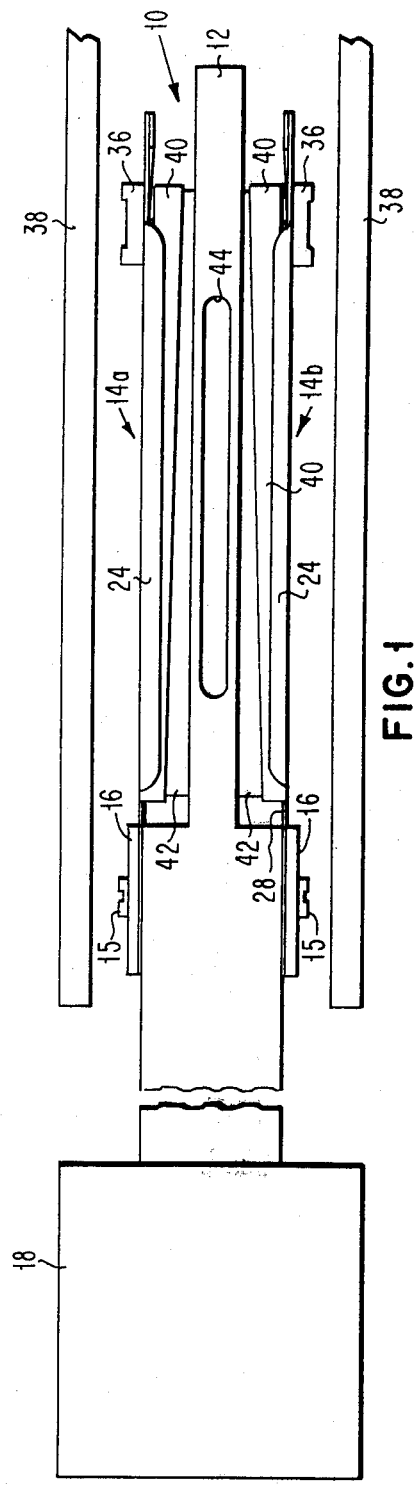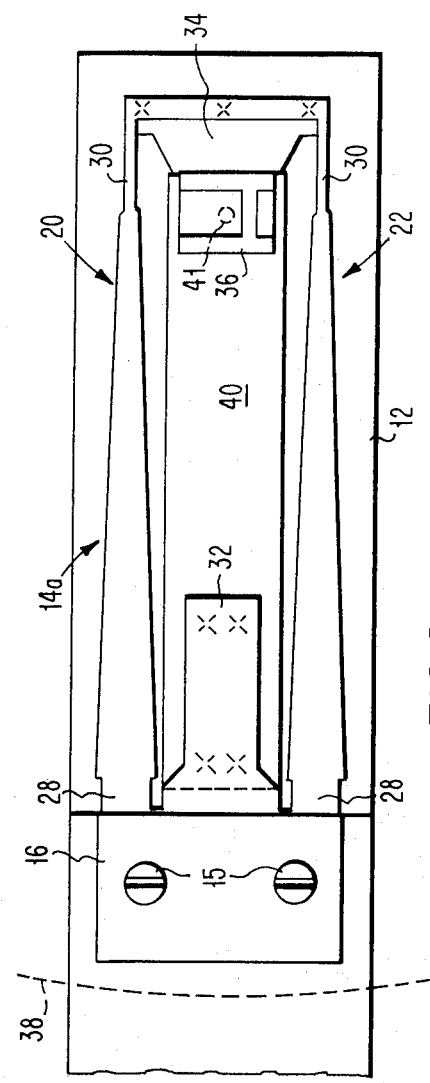
FIG. 1
FIG. 2

SUSPENSION FOR FLYING MAGNETIC HEAD

DESCRIPTION

1. Technical Field

This invention relates to a magnetic head assembly that flies in noncontact transducing relation with a moving magnetic medium, and in particular to a head suspension used with the flying magnetic head assembly.

An object of this invention is to provide a magnetic head assembly that is loaded to a magnetic medium from a noncontact position.

Another object of this invention is to provide a magnetic head assembly that is loaded to a magnetic medium while maintaining relative parallelism.

Another object is to provide a magnetic head assembly that eliminates friction and sticking of the heads with associated magnetic media.

A further object is to provide a magnetic head assembly which eliminates roll motion during head load and unload procedures.

2. Background Art

In presently known disk files, magnetic head sliders fly in transducing relation adjacent to rotating disks. The head sliders are generally mounted to suspensions which are biased during the nonoperation of the disk file to be unloaded, either in contact with an associated disk surface or spaced from the operative flying height position away from the disk surface. During operation, the head sliders are loaded into transducing relation to the disks by air flow or other similar means. An example of a disk file magnetic head apparatus of this type is disclosed in U.S. Pat. No. 4,141,049, issued Feb. 20, 1979. The loading mechanism described in the patent employs a negative pressure head slider, such as disclosed in U.S. Pat. No. 3,855,625, issued Dec. 17, 1974.

SUMMARY OF THE INVENTION

A magnetic head slider is supported by a suspension that is formed with two legs having rigid portions and resilient spring portions. The resilient spring portions provide opposing and substantially equal deflections and coact to provide a balanced motion of the head suspension and slider, so that a parallel relationship is maintained between the slider surface and the recording surface of the medium, during loading and during the transducing mode while the head is flying.

To this end, the suspension is coupled to a box arm structure, having a slot through which air is directed onto the suspension and slider to load the head to the magnetic medium. The flying height of the slider is determined by the air pressure applied to the suspension, and additionally by the pressure generated at the slider-disk interface.

BRIEF DESCRIPTION OF THE DRAWING

The invention will be described in greater detail with reference to the drawing in which:

FIG. 1 is a side view of a disk file apparatus, partly broken away, illustrating the head arm and suspension assembly, made in accordance with this invention;

FIG. 2 is a top plan view of a head arm suspension and slider, as employed in this invention;

Similar numerals refer to similar elements throughout the drawing.

DISCLOSURE OF THE INVENTION

Figure 3:
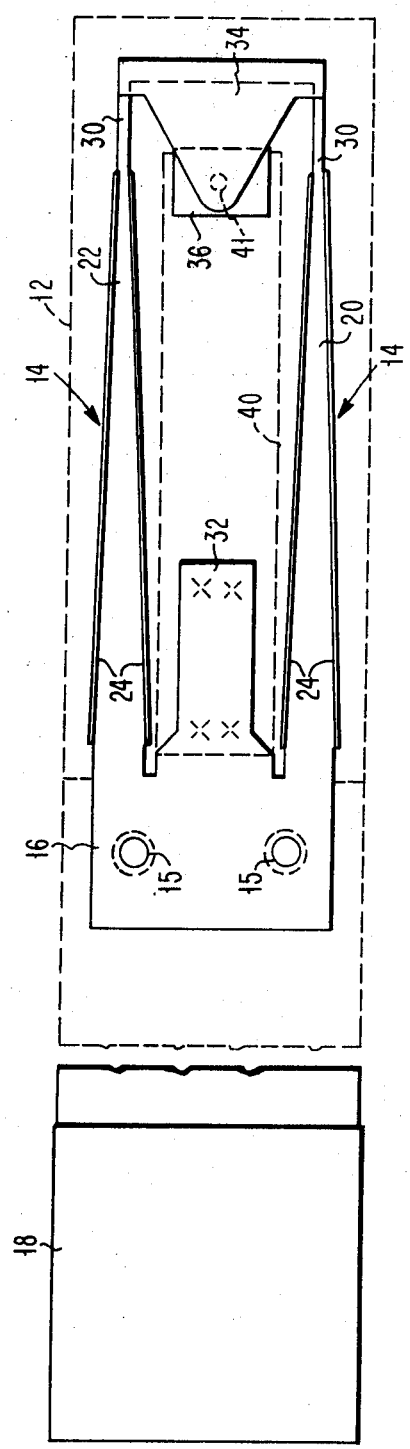
FIG. 3 is a bottom plan view of the head suspension and slider of this invention.

With reference to FIGS. 1-4, an example of a disk file is shown wherein a head arm assembly 10 includes a box-like arm structure 12 and a pair of magnetic head suspensions 14a, 14b. Suspension 14b is a virtual mirror likeness of suspension 14a, and therefore the description which will be directed to the suspension 14a is also applicable to the suspension 14b.

The head suspensions 14 are attached by screws 15 to rigid mount elements 16. The head arm assembly 10 is joined to an actuator 18, which may be a voice coil motor, for example.

Figure 4:
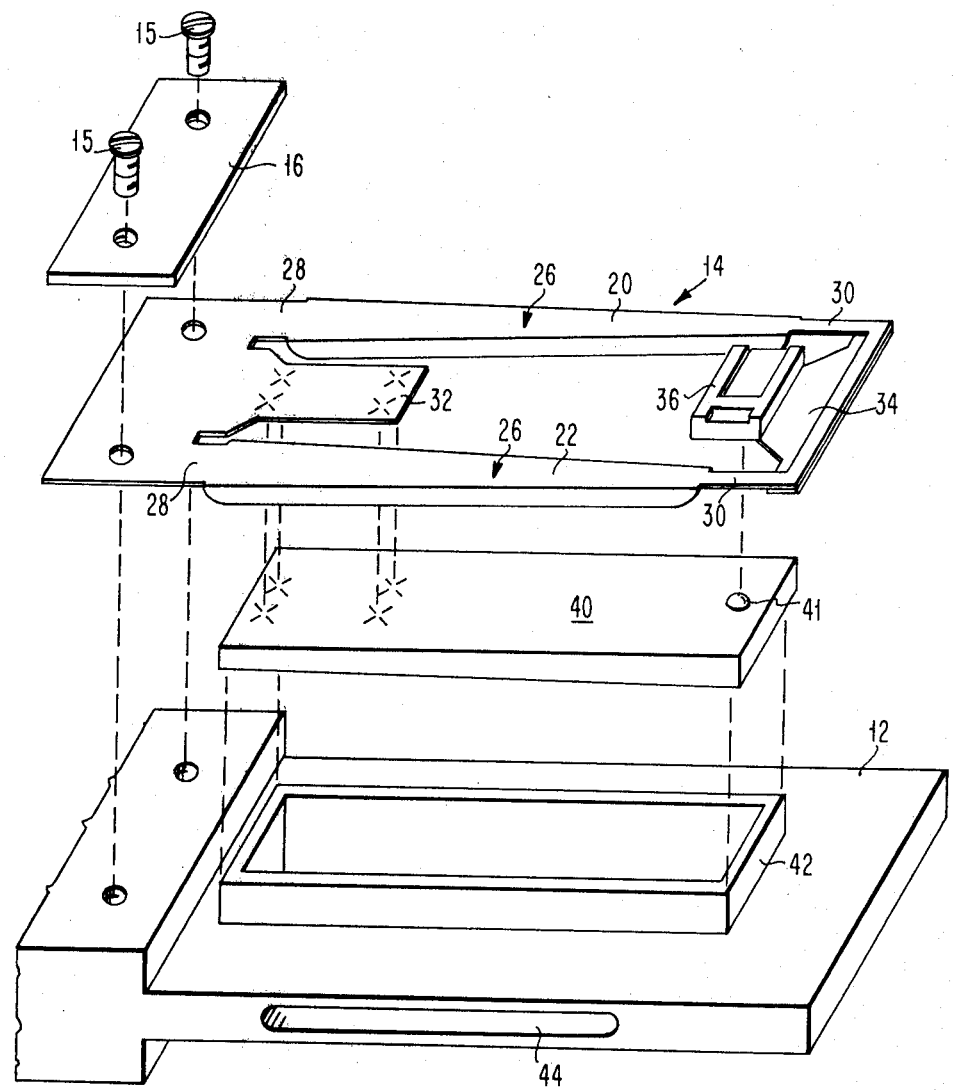
FIG. 4 is an exploded view of the several parts of the head arm and suspension assembly.

As depicted in FIGS. 2, 3, and 4, the head suspension 14, which is rectangular in form, has two tapered legs 20 and 22. Each leg has flanged portions 24 along each side at the center of the leg. The legs 20 and 22, which are made preferably from thin stainless steel, thus have central rigid sections 26 bounded by flexible sections 28 and 30. The suspension 14 has a flexible tongue element 32, extending from a cross-section which joins the legs 20 and 22, and projecting inwardly of the suspension structure. At the other end of the suspension, a rigid triangular element 34 is welded to the tapered ends of both legs 20 and 22 to provide rigidity adjacent to the flexible sections 30.

A head slider 36 which supports a transducer is mounted to the triangular element 34 by epoxy or other attachment means. The slider is preferably of the type having a negative pressure configuration, such as disclosed in U.S. Pat. No. 3,855,625.

When the disk is not rotating, the slider 36 and its transducer are out of contact and in a nontransducing relation with a magnetic disk 38. The opposing spring forces applied by the flexible sections 28 and 30 act to maintain the head and suspension in an unloaded condition, during which no active forces are applied to the head suspension.

As illustrated in the exploded view of FIG. 4, the head suspension 14 is attached to a rectangular cover or lid 40 by welding the tongue element 32 to the top and at one end of the lid 40. Displaced from the welded area and at the other end of the lid 40, a boss 41 is formed which is in contact with the triangular element 34. The movable lid seats in a close fit over a rectangular wall 42 projecting from the hollow arm structure 12. A slot 44 is formed in a side wall of the arm structure 12, for allowing air passage into the hollow interior of the arm box 12.

During operation of the disk drive, when the disks 38 are rotating, an air flow is generated by the disk rotation. The air passes through the slot 44 into the hollow interior of the arm structure 12 and out through the top opening of the wall structure 42. The air flow impinges on the lid 40 so that a load force is applied through the boss 41 to the triangular element 34. The load force is effectively applied to the center of the head slider 36, which is attached to the triangular element. The magnitude of the load force is a resultant of the rotational speed of the rotating disks and the amount of generated air flow which is applied to the lid 40. The amount of air flow and the resultant load force determine the spacing from the head to the disk.

Figure 5:
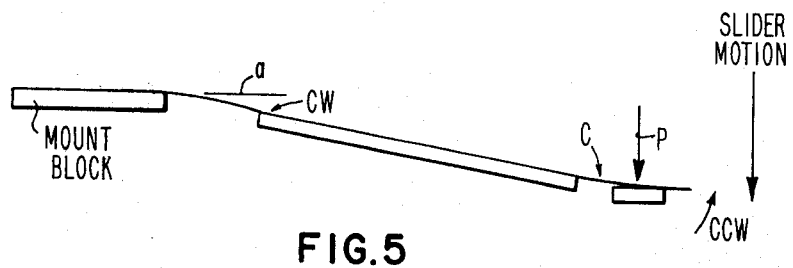
FIG. 5 is a representational diagram illustrating the application of forces to the head suspension which produce the parallelism of the head slider as it moves to a disk surface.

When the disk drive is first turned on and the disks start rotating, the head slider 36 is urged towards the disk surface. In keeping with this invention, the flexible sections 28 and 30 provide clockwise and counterclockwise deflections to the head suspension 14, as illustrated in FIG. 5. These motions, which are determined partly by the configuration of the tapered legs 20 and 22, and their thicknesses and material, act to bring the head slider 36 to a close flying position in transducing relation with the rotating disk surface. It should be noted that the head slider 36 reaches this close flying position before the disks have attained their maximum rotational speed.

During the movement of the head slider towards the disk, the clockwise and counterclockwise motions applied to the head suspension 14 are substantially in balance, so that the head slider surface maintains a parallel relationship to the disk surface. Also, during the loading phase of the head slider to the disk, the slider pivots about the boss 41 to maintain a proper orientation relative to the disk surface, which has very minute topographical variations.

When the head slider is in close flying relation to the disk surface, the negative pressure forces developed by virtue of the slider configuration brings the slider to a desired precise spacing between the head and disk, as disclosed in the aforementioned U.S. Pat. No. 3,855,625.

In a preferred embodiment of this invention, the arm structure 12 is made of aluminum, the head suspensions and the lids 40 are made of 0.002 inch thick stainless steel and the triangular element is made of 0.005 inch stainless steel.

There has been described herein a novel head arm assembly wherein two similar head suspensions are joined to a box-like arm structure. By virtue of balancing opposed load forces applied at the ends of each of the head suspensions, the head sliders attached to respective suspensions are loaded concurrently to associated disk surfaces in a parallel relationship. When flying adjacent to the disk surfaces, the parallelism of the head suspensions and head sliders is maintained relative to the disk surfaces, so that head crashes are avoided. Also, if the head approaches the disk in a parallel manner, then the force required to bring the head into air bearing position is reduced.

In a system of this type, since the heads are not in contact with the disk during start and stop, the problem of head sticking and friction between the heads and disks are virtually eliminated. The system allows the use of air flow generated by the rotating disks to develop a pressure differential that causes the heads to move from an unloaded to a loaded position. By coupling the pressure load to the head in a direction normal to the disk only, unwanted loads are decoupled and do not affect the head slider as it flies. In addition, the configuration disclosed herein enables the head slider to move to and from the disk surface without experiencing roll rotation.

What is claimed is:

1. A magnetic head arm assembly comprising:
   a suspension element having two legs, said legs being joined by a cross-section portion at one end;
   a flexible portion extending from said cross-section portion and projecting between said legs;
   a rectangular lid-like element, said flexible portion and lid-like element being joined;
   a box-like arm structure joined to said suspension;
   said lid-like element being matingly insertable into a cooperating opening in said box-like arm structure;
   a rigid element attached to said legs at the opposite end of said suspension element; and
   a magnetic head slider mounted to said rigid element, said suspension legs have rigid central sections and flexible end sections bounding said central sections whereby said head slider is adapted to move orthogonally relative to the surface of said box-like arm structure so that roll motion of the head slider is minimized.

2. A magnetic head arm assembly as in claim 1, wherein said arm structure has a hollow interior, and a slot for passing air flow to said hollow interior.

3. A magnetic head arm assembly as in claim 2, wherein said arm structure has on at least one surface an open wall structure connecting to said hollow interior.

4. A magnetic head arm assembly as in claim 3, wherein said lid has a boss for contacting said head slider and for serving as a pivot point for said head slider.

* * * * *